United States Patent [19]

Kim

[11] 4,401,220
[45] Aug. 30, 1983

[54] CASSETTE TAPE CASE

[76] Inventor: Dong J. Kim, 1710 Morgan La., Redondo Beach, Calif. 90278

[21] Appl. No.: 262,989

[22] Filed: May 12, 1981

[30] Foreign Application Priority Data

Dec. 10, 1980 [KR] Rep. of Korea .......................... 7947

[51] Int. Cl.³ .......................... B65D 43/16; A47F 1/00
[52] U.S. Cl. ...................................... 206/387; 312/15
[58] Field of Search .............. 206/387, 309, 493, 389; 312/319, 15, 20; 242/199

[56] References Cited

U.S. PATENT DOCUMENTS

| | | | |
|---|---|---|---|
| 3,763,994 | 10/1973 | Somers | 206/387 |
| 3,909,088 | 9/1975 | Dennehey et al. | 206/387 |
| 4,030,601 | 6/1977 | Ackeret | 312/319 |
| 4,067,629 | 1/1978 | Amatsu et al. | 206/387 |
| 4,113,091 | 9/1978 | Ackeret | 206/387 |
| 4,140,219 | 2/1979 | Somers | 206/387 |
| 4,196,806 | 4/1980 | Posso | 206/387 |

Primary Examiner—Joseph Man-Fu Moy
Assistant Examiner—Jimmy G. Foster
Attorney, Agent, or Firm—Max Geldin

[57] ABSTRACT

A cassette tape, preferably formed of plastic, comprising a body portion, an open end therein for insertion of a cassette tape, a hinged cover mounted adjacent the open end of such body portion, and having a closed end and side portions, said cover arranged to fit over and around the open end of the body portion to close said case, pins mounted on the side portions of the cover and a pair of curved notches in opposite sides of the body portion of the case adjacent the open end thereof, to accommodate such pins. A cassette tape having a raised flat surface on opposite sides thereof is adapted to be received within the case in the closed position of the cover, for storage in the case. To remove the cassette tape from the case, the cover is rotated outwardly on its hinge, causing the pins thereon to pass through the notches in the case until the pins come into contact with the inner edge of the raised flat surface of the cassette tape, and pulling the tape a substantial distance out of the case so that when the cover is rotated to a horizontal position, the tape can be completely removed from the case.

11 Claims, 5 Drawing Figures

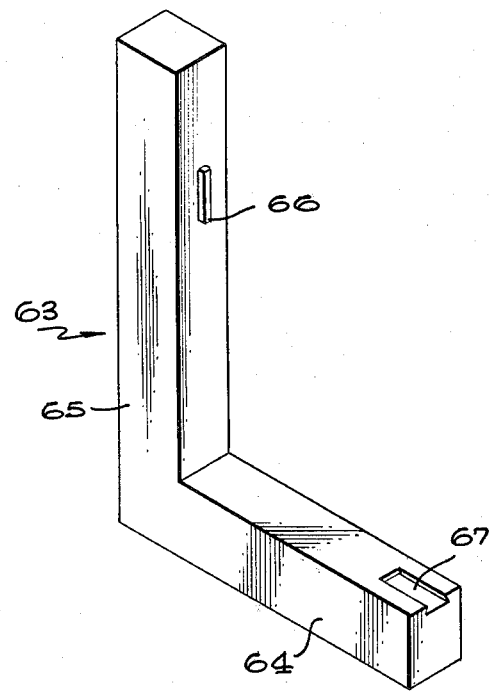

CASSETTE TAPE CASE

BACKGROUND OF THE INVENTION

This invention relates to a cassette tape case, and is especially concerned with the provision of a novel and simple case structure for removing and replacing cassette tapes.

Heretofore, cassette tape cases have been designed in such a manner that it is often inconvenient and difficult to remove the tape from the case. To overcome this problem, cassette tape cases to relatively complicated structure containing, for example, a spring mechanism for removal of the tape have been developed. However, in addition to the disadvantage of the increased cost of such cassette tape structures, it has been found that the rate of breakage is high over relatively short periods of time.

It is accordingly an object of the present invention to provide a cassette tape case of relatively simple structure and low cost. A particular object of the present invention is to provide a simple, reliable and durable cassette tape case, preferably formed of a plastic material, which provides substantially automatic removal of the cassette tape when the cover of the case is open, and which operates readily for removal of the tape from the case and insertion of a tape into the case.

SUMMARY OF THE INVENTION

The above objects and advantages are achieved by the provision of a cassette tape case comprising a body portion, and an open end therein for insertion of a cassette tape, a hinged cover mounted adjacent the open end of such body portion, and having a closed end and side portions, said cover arranged to fit over and around the open end of the body portion to close said case, pins mounted on the side portions of the cover and a pair of curved slots or notches in opposite sides of the body portion of the case adjacent the open end thereof, to accommodate such pins. A cassette tape having a raised flat surface on opposite sides thereof is adapted to be received within the case in the closed position of the cover, for storage in the case. To remove the cassette tape from the case, the cover is rotated outwardly on its hinge, causing the pins thereon to pass through the notches in the case until the pins come into contact with the inner edge of the raised flat surface of the cassette tape, and pulling the tape a substantial distance out of the case so that when the cover is in its rotated horizontal position, the tape can be completely removed from the case.

In preferred practice, the cassette case is constructed so that opposite sides of the body portion of the case adjacent the open end thereof are ribbed to define outer side portions to receive the opposite side portions of the hinged cover over such side portions, and the slots or notches on the opposite sides of the body portion of the case are located in such outer side portions of the case. Also, such outer side portions of the cassette tape case are cut away adjacent the open end of the case to accommodate the raised flat surfaces of the cassette tape, when the latter is inserted into the case and the hinged cover is closed.

DETAILED DESCRIPTION OF THE INVENTION AND PREFERRED EMBODIMENTS

The invention will be more clearly understood from the description below, taken in connection with the accompanying drawings wherein:

FIG. 5 is a perspective view illustrating a holder for the cassette tape case of FIG. 1.

Referring to FIGS. 1 to 4 of the drawings, the cassette tape case indicated at 10, is preferably made of a plastic material of any suitable type, such as vinyl, acrylate or acetate polymers, and is preferably transparent or translucent. The cassette case 10 has a body portion 12 and an open end 13 which is adapted and arranged to be closed by means of a hingedly mounted cover 14, to permit storage of a cassette tape, indicated at 16, within the case.

Figure 1:
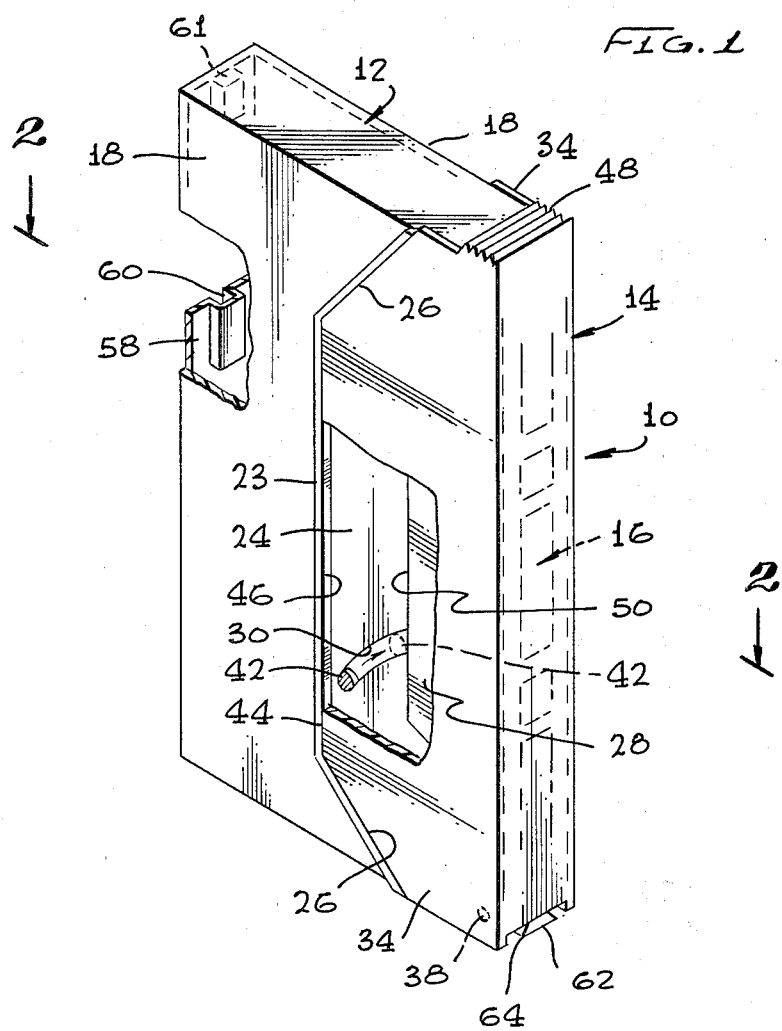
FIG. 1 is a perspective view of the cassette case of the invention, with portions broken away for greater clarity.
Figure 2:
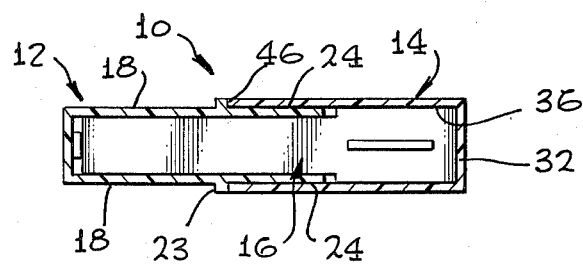
FIG. 2 is a section of the cassette case, taken on line 2—2 of FIG. 1.

On opposite parallel sides 18 of the body portion 12 of the case, adjacent the open end 13 thereof is a cut-away section or notch 20, of generally trapezoidal shape, and having outwardly inclined side edges 22, for a purpose noted below. Adjacent the cut-away sections 20 on opposite sides 18 of the case body 12, and adjacent the open end of the case, are ribs 23, defining outer side portions 24, also of generally trapezoidal shape, and having outwardly extending angular rib members 26. The cassette case 10 is sufficiently wide to receive and accommodate the cassette tape 16, which is provided on opposite sides, and at one end thereof, with raised flat surfaces 28, also of generally trapezoidal shape, so that when the cassette tape is inserted into the case, as seen in FIG. 1, the entire cassette tape is accommodated within the width of the case, with the raised flat portions 28 of the tape fitting into and received within the cut-away sections 20 adjacent the open end of the case. Within the outer side portions 24 on opposite sides of the case body 12, and at the lower end thereof, are a pair of curved slots or notches 30 which extend upwardly into and communicate with the cut-away sections 20 adjacent the open end of the case body.

The cover 14 mounted adjacent the open end 13 of the case has a closed end 32 and a pair of opposite parallel trapezoidal sides 34, forming an opening 36 within the cover which fits over the open end of the case to close same, as noted in greater detail hereinafter.

At the lower bottom corner of the inside surfaces of the sides 34 of cover 14 are a pair of aligned pins 38 which are received in holes 40 at the bottom corner of the outer side portions 24 of the case body 12, forming a hinge to provide pivotal motion of the cover about the lower end thereof, adjacent the open end of the cassette case. The cover 14 is also provided with a pair of aligned pins 42 on both inner sides 34 of the cover adjacent the lower inner end thereof, so that when the cover is pivoted counterclockwise toward its closed position, as seen in FIG. 1, the pins 42 are received within and pass through the curved notches 30 and come to rest at the lowest point of the curved notches when the cover is in fully closed position, with the trapezoidal sides 34 of the cover received over the outer side portions 24 of the case, and with the outer edges 44 of cover 14 in substantial engagement with the outer edges 46 of the ribs 23 on opposite sides 18 of the case body 12, enclosing a cassette tape 16 in the case. At the top of the case cover 14 is provided a roughened surface 48 so that the cover can be pulled open easily with the fingertips. The entire shape of the cassette case 10, when closed, resembles an envelope, as seen in FIG. 1.

Figure 3:
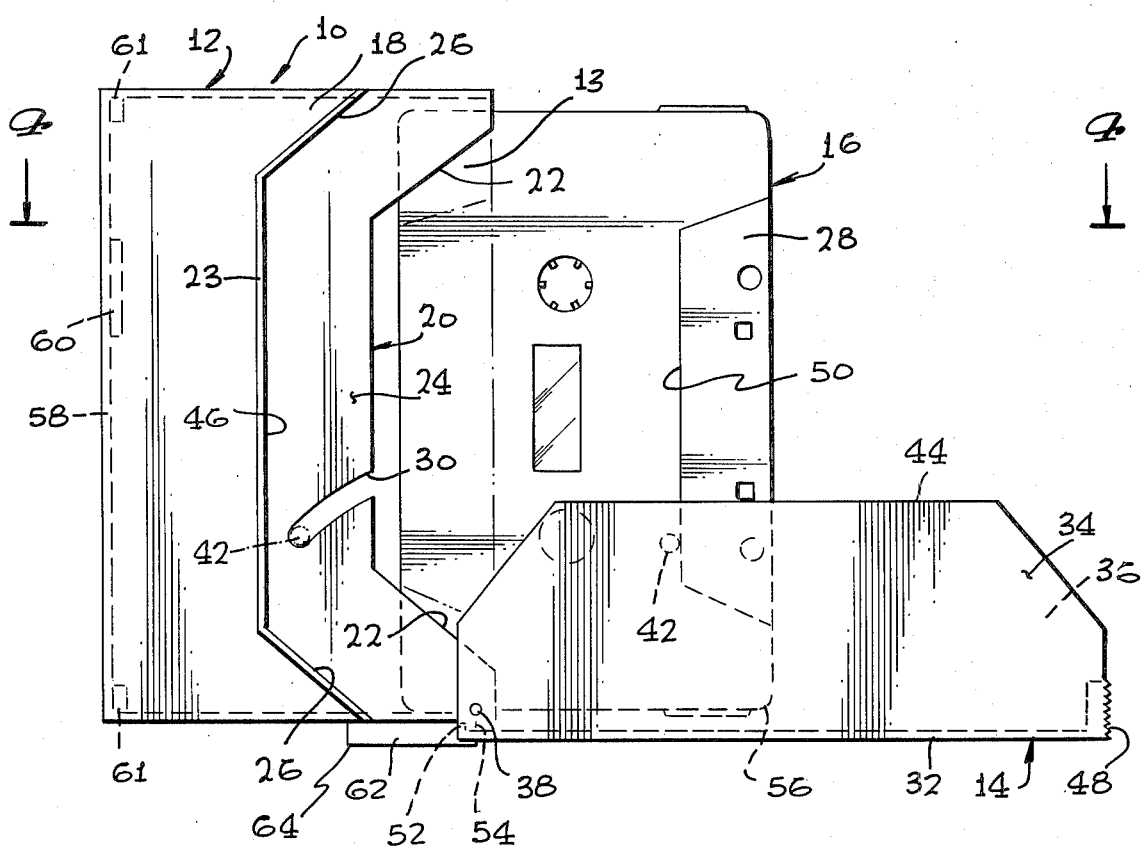
FIG. 3 is a side elevation of the cassette case of FIG. 1, showing the case with the cover pivoted to its open position for removal of a cassette tape from the case.
Figure 4:
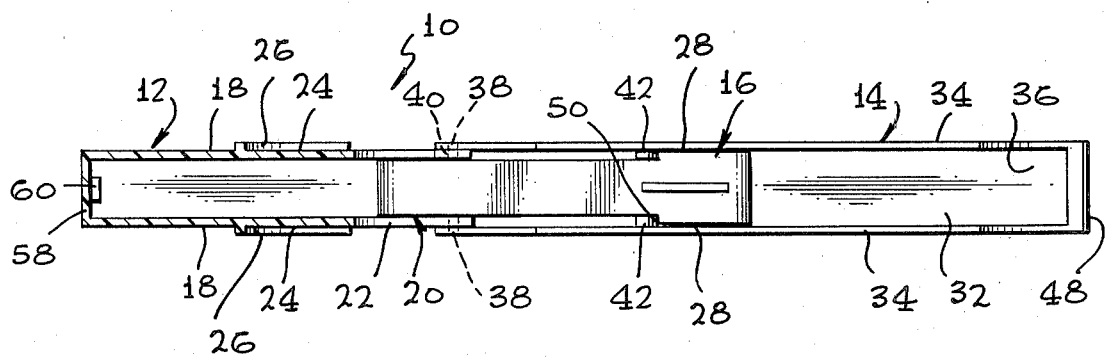
FIG. 4 is a cross section taken on line 4—4 of FIG. 3.

In the operation of the cassette case of the invention, for removal of a cassette tape 16 from the case, the fingertip is applied against the roughened surface 48 to pivot the cover downwardly in a clockwise direction on the cover hinge pins 38, causing the pins 42 on the cover to pass upwardly through the curved notches 30 until such pins come into contact with the inner edge or shoulder 50 on the raised portions 28 of the cassette tape 16, as indicated in dotted lines in FIG. 1. Further pivotal downward motion of the cover, as seen in FIG. 3, with pins 42 in contact with shoulders 50 pulls the cassette tape 16 out of the case to the right and into the open end 36 of the cover for a substantial distance, for example about two-thirds of the way out of the case, when the cover reaches its lowermost horizontal position as shown in FIG. 3. This lowermost position of the cover is reached when the lowermost outstanding end portion 52 at the bottom of the cover makes contact with the shoulder 54 at the lower end of the case body 12, adjacent the opening 13 therein. At this stage, the cassette tape 16 can be pulled with one hand further to the right, viewing FIG. 3, through the opening 36 in the cover and completely out of the case.

To close the cover and replace the tape, with the cover in the lowermost open position shown in FIG. 3, the tape is pushed through the open portion 36 of the cover between the sides 34 thereof until the shoulders 50 on the raised portions 28 of the tape make contact with the pins 42 on the cover 14. The cover is then pivoted in a counter-clockwise direction, viewing FIG. 3, causing the inner surface of the closed end 32 of the cover to contact the bottom right corner 56 of the cassette tape 16, and on further counter-clockwise rotation of the cover 14, the cassette tape 16 is pushed horizontally inwardly into the body 12 of the case, and the pins 42 on the cover 14 are received and pass downwardly through the curved notches 30, while the sides of the cover fold over the outer side portions 24 of the case body 12, so that when the cover has been rotated 90° and is in place vertically on the case, in the position shown in FIG. 1, the pins 42 are located at the lower end of the notches 30, and the sides 34 of the cover have been fully positioned over the outer side portions 24 on opposite sides of the case body 12. This completely closes the case with the cassettte tape therein.

This operation, as can be seen, provides one-handed access to the cassette tape 16 within the case, and the cover 14 opens and closes readily to withdraw and insert a tape, the cover being guided in its pivotal or hinged motion by pins 42 in the path of the curved notches 30.

It is accordingly seen that the invention provides a simplified cassette case structure, which substantially reduces production cost while affording a readily operable and durable structure. Because of the substantially reduced number of moving parts, breakage of parts on the case is minimized, and the cassette case can be used over a long period of time without damage and replacement.

Although not necessary, and as an optional feature, the body 12 of the cassette case of the invention is provided at the closed end 58 thereof with a rectangular shaped notch 60, and is also provided at the lower bottom inner end thereof adjacent the opening 13, with a guide member or tongue 62 which flairs outwardly at 64. Alternatively, in place of the notch 60, there can be provided a pair of notches indicated by dotted lines 61, at each of the upper and lower corners of the closed end of the case. The notch 60 or notches 61, and guide member 62 are provided to serve as attachment members for mounting the cassette case on a holder, as illustrated in FIG. 5, in the form of an L-shaped bracket 63 having a horizontal foot 64 and a vertical leg 65. On the inside surface of the leg 65 is a rectangular shaped lug 66, and in the upper surface of the foot 64 adjacent the outer end thereof is a longitudinally extending V-shaped slot or groove 67 which narrows at the top of the slot.

The case 10 is assembled on the holder 63 by sliding the case into the space formed between the foot 64 and the leg 65, with the bottom of the case in sliding contact with the upper inner surface of foot 64, with the tongue 62 on the case registering with and sliding into the groove 67 on the foot, and the notch 60 at the closed end of the case received by and registering with the lug 66 on the leg of the holder.

The holder is particularly of the type described and claimed in my co-pending application Ser. No. 274,314, filed 6/16/81.

While particular embodiments of the invention have been described for purposes of illustration, it will be understood that various changes and modifications within the spirit of the invention can be made, and the invention is not to be taken as limited except by the scope of the appended claims.

What is claimed is:

1. A cassette tape case which comprises a body portion having a open end therein for insertion of a cassette tape, a cover mounted adjacent the open end of said body portion, said cover having a closed end and an open side portion, and arranged to fit over the open end of said body portion to close said case, pin means mounted on said side portion of said cover, said body portion containing slot means for registration with said pin means, said pin means adapted to make contact with a portion of said cassette tape during pivotal motion of said hinged cover from its closed to its open position to pull the cassette tape outwardly and to permit removal of at least a portion of said tape from the body portion of said case through the open side portion of said cover, in the open position of said cover.

2. The cassette tape case of claim 1, said body portion having an outer side portion adjacent the open end of said body portion, said side portion of said cover being received over said outer side portion when said cover is pivoted into closed position over the open end of said body portion, said slot means being positioned in said outer side portion.

3. The cassette tape case of claim 2, said body portion including a cut-away section adjacent the open end of said body portion and located adjacent said outer side portions, said cut-away section adapted to receive a raised portion of a cassette tape when said tape is inserted in said body portion, said pin means on said side portion of said cover means being adapted to make contact with said raised portion of said cassette tape during said pivotal motion of said hinged cover from closed to open position, and to remove a substantial portion of said tape from said body portion.

4. The cassette tape case of claim 1, said cover being hinged by pivot means disposed adjacent the lower open end of said body portion, to pivot said cover from a closed vertical position thereof over said open end of said body portion, to a horizontal open position, to permit said removal of at least a portion of said tape from said body portion.

5. The cassette tape case of claim 1, said body portion having a pair of opposite parallel sides, said open side portion of said cover comprising a pair of parallel sides and forming an opening in said cover for receiving at least a portion of a cassette tape during pivotal opening and closure of said cover, said pin means comprising a pair of aligned pins mounted on the inner opposite sides of said cover, and said slot means comprising a pair of aligned curved slots in said opposite sides of said body portion, said pins passing through said slots and adapted to make contact with said portion of said cassette tape during said pivotal motion of said hinged cover, for said removal of at least a portion of said tape from the body portion of said case, through said opening in said cover.

6. The cassette tape case of claim 5, said body portion having rib means on the outer surfaces of said opposite sides of said body portion, defining outer side portions, said sides of said cover being positioned over said outer side portions when said cover is pivoted into closed position over the open end of said body portion, with the outer edges of said sides of said cover in engagement with the outer edges of said rib means, said curved slots being positioned in said outer side portions.

7. The cassette tape case of claim 1, said cover being hinged by pivot means disposed adjacent the lower open end of said body portion, to pivot said cover from a closed vertical position thereof over said open end of said body portion to a horizontal open position to permit said removal of a substantial portion of said tape from said body portion, and including stop means for maintaining said cover in said horizontal position to permit said tape to be completely withdrawn from said body portion through the open side portions of said cover between the parallel sides thereof.

8. The cassette tape case of claim 1, said pair of pins on the inner opposite sides of said cover being mounted at the lower inner end of said cover, and said curved slots being positioned in the lower end of said outer side portions of said body portion and communicating with said cut-away section.

9. A cassette tape case which comprises a body portion having an open end therein for insertion of a cassette tape, said body portion having a pair of opposite parallel sides, a hinged cover mounted for pivotal motion adjacent the lower open end of said body portion, said cover having a closed end and an open side portion, said open side portion of said cover comprising a pair of parallel trapezoidal sides and forming an opening in said cover, said cover arranged to fit over the open end of said body portion to close said case, said opening between the parallel sides of said cover being adapted to receive at least a portion of a cassette tape during pivotal motion of said cover for opening and closing said case, a pair of aligned pins mounted on the inner opposite sides of said cover adjacent the inner end thereof, a pair of ribs on the outer surfaces of said opposite sides of said body portion adjacent the open end thereof, and defining outer side portions of trapezoidal shape, said trapezoidal sides of said cover being received over said outer side portions, with the outer edges of the sides of said cover in substantial engagement with said ribs, when said cover is pivoted into closed position over the open end of said body portion, a pair of aligned curved slots in the lower end of said outer side portions on opposite sides of said body portion, said pins on said cover registering with said slots and resting at the lower end thereof when said cover is in closed position over the open end of said body portion, a cut-away section adjacent the open end of said body portion and located adjacent said outer side portions, said cut-away section adapted to receive a pair of raised portions of a cassette tape disposed adjacent said outer side portions on opposite sides of said body portion, when said tape is completely inserted in said body portion, said curved slots communicating at the upper end thereof with said cut-away section, said pins on the opposite sides of said cover passing through said curved slots and being adapted to make contact with said raised portions of said cassette tape during said pivotal motion of said hinged cover in one direction, said cover being hinged by pivot means disposed adjacent the lower open end of said body portion, to pivot said cover from a closed vertical position thereof over said open end of said body portion, to a horizontal open position, to permit removal of a substantial portion of said tape from said body portion through the open side portion of said cover when said cover has been opened to its lowermost horizontal position, and stop means for maintaining said cover in said open horizontal position.

10. A cassette tape case which comprises a body portion having an open end therein for insertion of a cassette tape, a hinged cover mounted adjacent the open end of said body portion, said cover having a closed end and an open side portion, and arranged to fit over the open end of said body portion to close said case, pin means mounted on said side portion of said cover, said body portion containing slot means, said body portion having a pair of opposite parallel sides, said open side portion of said cover comprising a pair of parallel sides and forming an opening in said cover for receiving at least a portion of a cassette tape during pivotal opening and closure of said cover, said pin means comprising a pair of aligned pins mounted on the inner opposite sides of said cover, and said slot means comprising a pair of aligned curved slots in said opposite sides of said body portion, said body portion having rib means on the outer surfaces of said opposite sides of said body portion, defining outer side portions, said sides of said cover being positioned over said outer side portions when said cover is pivoted into closed position over the open end of said body portion, said curved slots being positioned in said outer side portions, said body portion including a cut-away section adjacent the open end of said body portion and located adjacent said outer side portions, said cut-away section adapted to receive a pair of raised portions of a cassette tape disposed adjacent said outer side portions, when said tape is inserted in said body portion, said pins on opposite sides of said cover passing through said curved slots and being adapted to make contact with said raised portions of said cassette tape during pivotal motion of said hinged cover from its closed to its open position, and to remove a substantial portion of said tape from said body portion through said opening in said cover.

11. A cassette tape case which comprises a body portion having an open end therein for insertion of a cassette tape, a hinged cover mounted adjacent the open end of said body portion, said cover having a closed end and an open side portion, and arranged to fit over the open end of said body portion to close said case, pin means mounted on said open side portion of said cover, said body portion containing slot means for registration with said pin means, said pin means adapted to make contact with a portion of said cassette tape during pivotal motion of said hinged cover for removal of at least a portion of said tape from the body portion of said case through the open side portion of said cover, including means connected to the outer wall of said body portion for attachment of said cassette tape case to a holder for the case.

* * * * *